United States Patent [19]
Glancy

[11] Patent Number: 5,853,790
[45] Date of Patent: Dec. 29, 1998

[54] VALUE ENHANCING METHOD FOR PROCESSING POULTRY

[75] Inventor: John F. Glancy, Winter Park, Fla.

[73] Assignees: The Elevated Systems Limited Partnership; The Elevated Technology Limited Partnership, both of Orlando, Fla.

[21] Appl. No.: 806,836

[22] Filed: Feb. 25, 1997

[51] Int. Cl.$^6$ ........................................ A23L 1/315
[52] U.S. Cl. .................... 426/644; 426/516; 426/518; 426/524; 426/646
[58] Field of Search .................... 426/644, 646, 426/518, 524, 516

[56] References Cited

U.S. PATENT DOCUMENTS

| | | | |
|---|---|---|---|
| 2,916,381 | 12/1959 | Jumenko | 99/107 |
| 3,615,584 | 10/1971 | Schlamb | 99/108 |
| 4,938,988 | 7/1990 | Fankhauser | 426/644 |
| 5,202,144 | 4/1993 | Yaiko | 426/574 |

OTHER PUBLICATIONS

Rombauer et al. *Joy of Cooking,* Bobbs–Merrill Co., Inc. pp. 479–480, 1975.

*Primary Examiner*—Helen Pratt
*Attorney, Agent, or Firm*—Dorothy S. Morse

[57] ABSTRACT

A method for processing poultry which converts a commodity into a food product, provides varying levels of enhanced nutrition and flavor in the several raw poultry meat products obtained from each whole bird, provides less expensive poultry meat products than can be prepared by current processing techniques, effectively maximizes use of all of the meat available from a poultry carcass, and provides even product flow from poultry carcasses to white meat biased consumers. The method provides for the sectioning, de-boning, and cutting of a bird carcass to provide several breast meat portions and one leg meat portion each with a packet formed therein. The remainder of the meat on the poultry carcass is ground with dark meat from one leg meat portion, and varying amounts of non-meat protein enhancing and flavor enhancing ingredients to form a solidified cohesively bonded mass that is extruded onto each meat portion which after rolling retains the mass centrally therein for easy handling and even cooking.

17 Claims, No Drawings

VALUE ENHANCING METHOD FOR PROCESSING POULTRY

BACKGROUND

1. Field of Invention

This application relates to the disclosure provided in Disclosure Document number 394,871 filed Mar. 14, 1996, in the U.S. Patent and Trademark Office and entitled "Poultry Processing Technology."

This invention relates to methods for the commercial preparation of foods, specifically to a method for processing poultry which provides several raw white poultry meat products and one raw dark meat poultry product from each whole bird processed as a result of the extrusion of a cohesive blend of ground poultry meat and other ingredients onto evenly cut pieces of poultry meat which are subsequently rolled and immediately thereafter frozen for storage and distribution, a method which also enhances the flavor of the poultry meat, can provide varying levels of enhanced nutrition in the raw poultry meat product created thereby, provides a poultry meat product for cooking by traditional methods such as grilling, micro-waving, pan frying, oven baking, deep frying, or steaming, and which can be provided to the consumer less expensively than raw poultry products prepared by currently used processing techniques, and further which provides a raw poultry meat product that maximizes the effective use for human consumption of all of the types of meat available from a poultry carcass, particularly the thigh and drumstick meat. Applications may include, but are not limited to, use by businesses processing poultry for restaurants and the airline industry, use in providing varying levels of nutrition within a finished poultry product to meet the changing dietary needs of patients with different diseases such as HIV/AIDS, use in providing a high protein food product for military and institutional feeding programs, use by health facilities to provide patients with a low fat food product, and wholesale and retail sale by food distributors to provide individuals with a food product that is flavorful, has enhanced nutrition, cooks evenly, and is cost effective, as well as convenient and easy-to-use.

2. Description of Prior Art

Poultry consumption is becoming increasingly used as a regular and important part of the human diet. As a result, the poultry industry is continually challenged to find ways in which to process poultry that effectively maximizes the use of meat from an entire poultry carcass. Generally, the public as a whole favors poultry breast meat over the darker poultry meat obtained from the leg quarters. This preference has resulted in the darker poultry meat being generally in surplus which directly affects the market price structure of the faster moving poultry breast and wing portions. Even when sold at a favorable price, the public does not purchase sufficient dark meat to eliminate the surplus problem. Consequently, due to the reduced market value of the dark poultry meat from the leg quarters, the price for breast meat remains at an elevated level to compensate therefor. The poultry processing method of the present invention would enhance the value of the dark poultry meat generating product movement, and at the same time allow the poultry industry price structure merchandising opposition that would benefit of both individual and institutional consumers.

Until recently, poultry wings, particularly chicken wings, were also disfavored by the public and in great surplus compared to poultry breast meat. The current popularity of chicken wings as a restaurant appetizer has reduced this surplus. Also, during conventional poultry processing, after the processing procedure of separating the bone-in leg portions and the bone-in poultry breast from a poultry carcass, a significant amount of poultry meat trim remains on the neck and the back of the poultry carcass, as well as in trim resulting from the processing procedure of separating the portions of the poultry carcass. A large portion of such poultry meat trim is comminuted and marketed in bulk, being sold to meat packers to make hot dogs and processed sandwich meats such as chicken bologna. Some of the surplus poultry meat trim is also sold for processing into soups, frozen food products, animal food products, and fertilizer.

A similar problem exists in the poultry industry with market devalued birds, those which have been damaged during processing and have a broken bone or torn skin. The present invention also enables the poultry industry to effectively maximize the use of the poultry meat from market devalued birds, as well as the poultry meat trim. The present invention proposes a method for processing poultry which adds value to the darker poultry meat from the leg quarters, the residual poultry meat trim remaining on the neck and the back of a poultry carcass, as well as the meat from market devalued birds damaged during processing, while at the same time changing a commodity into a food product and providing the public with a good tasting, easy-to-cook, nutritionally enhanced raw food product, the nutritional value of which can be selectively varied to suit differing needs.

The present invention contemplates a raw food product made from poultry meat portions and a seasoned ground poultry meat blend. Poultry meat from each bird used, including chickens, turkeys, ducks, geese, and any other fowl larger than cornish game hens, is sectioned into several portioned pieces and residual non-portioned poultry meat. The non-portioned residual poultry meat and one dark meat leg portion are ground, protein enhancing ingredients such as homogenized liquid eggs which is also used as a binder, long grain enriched white rice, and an option of soy products, are mixed with the ground meat, after which the ground meat is mixed with flavor enhancing ingredients to form a solidified cohesively bonded mass. After the remaining dark meat leg portion and the poultry breast meat portions are de-boned, each portion is cut so that it can form a pocket and an amount of seasoned poultry meat blend is extruded onto each meat portion whereafter it is rolled to form a pocket around the blend to create a good tasting, easy-to-cook raw poultry food product the nutritional value of which can be varied to suit differing nutritional needs, and which can be conveniently cooked by traditional methods such as grilling, micro-waving, pan frying, oven baking, deep frying, and steaming prior to barbecuing. Several U.S. patents such as U.S. Pat. No. 3,615,584 to Schlamb (1971), U.S. Pat. No. 2,916,381 to Jumenko (1959), and U.S. Pat. No. 5,202,144 to Yaiko (1993), disclose methods and products using ground poultry meat, however, the present invention can be distinguished from them all.

The invention thought to be most closely related to the present invention is the invention in U.S. Pat. No. 4,938,988 to Fankhauser (1990). However, the primary object of the Fankhauser invention is to make chicken sausage, while the primary object of the present invention is to provide a new processing method for the poultry industry which will enable complete poultry carcass even flow movement, with the option of price structure flexibility benefiting the consumer. The Fankhauser invention discloses a poultry sausage made without the use of binders which can be inserted into a tube made from a de-boned chicken wing with its skin and meat remaining. Traditionally, since poultry meat has no natural binders, such as fat, prior to Fankhauser a combination of beef, pork, veal or starches were added to the poultry meat to make it cohesive when it was ground. Also, traditionally the poultry meat was ground by a coarse grinding step followed by a fine grinding step. The Fankhauser invention contemplates a one-step grinding of seasoned chicken meat under high pressure in a meat grinder with a fine grinding disc. The present invention differs from the Fankhauser invention in that the Fankhauser invention inserts ground poultry meat into a de-boned wing and is held into place by the skin portion of the wing. In contrast, the present invention contemplates use of poultry wing meat only as part of a meat blend or as a decorative enhancement to a breast meat portion. In addition, the present invention provides a way to maximize use of thigh and drumstick meat and enhance its value both economically and nutritionally by using a seasoned enhanced-protein meat blend comprising one dark meat leg portion in combination with other residual poultry trim, non-meat proteins including but not limited to homogenized liquid eggs which act as a binder and long grain enriched white rice, seasonings, and an option of soy products. The present invention further converts the leg and thigh meat from a commodity into a food product by extruding this blend into pockets formed within de-boned portions of poultry meat to provide the public with one raw poultry meat leg portion and several raw poultry meat breast portions from each poultry carcass processed. The above-mentioned prior art does not teach the present invention and it is not otherwise known to have a method for creating a protein-enhanced poultry food product, the nutrition of which can be selectively varied for differing purposes, the method also solving a long standing problem in the poultry industry of uneven product movement of dark poultry meat by providing a processing method which effectively maximizes the use and value of meat from an entire poultry carcass.

SUMMARY OF INVENTION

OBJECTS AND ADVANTAGES

It is the primary object of this invention to provide a method for processing poultry which effectively maximizes the use of poultry meat from an entire poultry carcass while providing the public with an appealing, easy-to-cook, flavorful food product. It is also an object of this invention to provide a method for processing poultry which provides the public with a nutritionally enhanced food product, the nutritional value of which can be easily varied to suit differing needs. A further object of this invention is to provide a method for processing poultry which creates a raw food product that can be offered to the public at a reduced cost as compared to raw poultry products processed by prior art poultry processing methods. It is also an object of this invention to provide a method for processing poultry which produces a raw poultry food product that cohesively maintains its shape and texture prior to and during cooking by a variety of traditional cooking methods to include grilling, micro-waving, pan flying, oven baking, deep frying, and steaming prior to barbecuing. A further object of this invention is to provide a method for processing poultry which produces a raw poultry food product that is equally attractive for hotel, restaurant, and institutional trade use as well as for use by individuals as part of a home cooked meal.

As described herein, the present invention would provide a method for enhancing the value of all of the meat from a bird carcass as well as the meat in market devalued birds which have been damaged during processing. Whole birds would be sectioned into dark meat leg portions, which include both thigh and drumstick meat as a continuous piece of muscle, and several breast meat portions. The meat remaining on the neck and back of each carcass as residual poultry trim, as well as one dark meat leg portion, would then be trimmed and combined with non-meat protein enhancers and flavor enhancing ingredients to provide a poultry blend that is nutritionally enhanced and flavorful. This solidified cohesively bonded mass would then be extruded onto the breast portions and the remaining dark meat leg portion to provide raw poultry products for the consumer. In the preferred embodiment, the residual boning trim, as well as one dark meat leg portion, is ground with cooked long grain enriched white rice and then mixed with a selection of flavor enhancing ingredients until a cohesively bonded, seasoned ground poultry meat blend is formed. In amounts equivalent to approximately one-third of the weight of each poultry meat portion, the blend is extruded onto the remaining dark meat leg portion and the several breast meat portions which are then wrapped as pockets around the blend. The poultry skin can be left on the outside of each portion, or removed, according to the nutritional needs of the person for whose consumption it is intended. However, the skin on the outside of each portion is not critical for the individually portioned food products of the present invention to hold their shape during cooling and storage. The flavor enhancing and non-meat protein additives to the blend can be varied to provide raw a poultry product suitable for people with different dietary restrictions as well as patients with differing nutritional needs. The solidified cohesive bond of the blend keeps the rolled configuration of poultry meat breast portions intact. In the alternative, as options, the dark poultry meat in boneless leg quarters may be ground, seasoned, and added to a pocket in a dark meat leg portion to provide a one-hundred percent dark meat finished product with no taste difference, or a one-hundred percent dark meat seasoned blend can be added to pockets in breast portions. Also, a flat sliced longated incision in the remaining dark meat leg portion can be cut to act as a lock to retain the blend centrally within the rolled dark meat leg portion for even cooking. It is further contemplated for the first wing joint to be left attached to a boneless breast portion as part of the rolled configuration for serving in upper level restaurants. In addition, since the method of the present invention provides a portioned raw poultry product which is cohesively bonded and has an outer surface made of a continuous piece of muscle tissue, it is well suited for cooking by traditional cooking methods, such as grilling, micro-waving, pan flying, oven baking, deep frying, and steaming prior to barbecuing. Since the method of the present invention effectively maximizes use of all of the meat on a poultry carcass, while converting a commodity to a food product, the portioned product created thereby solves a long-standing dark meat surplus problem in the poultry industry. Also, advantageous is that the raw food product of the present invention could be offered to the public at a reduced cost as compared to poultry breast meat portions prepared by current processing methods. Further, since the portioned poultry meat product created by the present invention is one that is appealing, convenient, and easy-to-use, it would be equally attractive for hotel, restaurant, and institutional feeding programs as well as for use by individuals.

The description herein provides preferred embodiments of the present invention but should not be construed as limiting the scope of the poultry processing method of the present invention. For example, variations in the types of non-meat protein enhancing additives used, the amounts of each flavor enhancing ingredient used, the type of grinder used, the amount of time during which the poultry meat is ground, the portion of white poultry meat and dark poultry meat used as the finished product which could include one-hundred percent white meat or one-hundred percent dark meat as long as overall there was even product movement of the entire poultry carcass, and the manner in which the seasoned ground poultry meat blend is extruded or applied to the remaining leg portion and the several breast meat portions, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

The present invention comprises a method for processing chicken wherein a pocket is formed in an intact portion of poultry meat muscle and the pocket is filled with a nutritionally enhanced solidified and cohesively bonded blend consisting of ground poultry meat including various combinations of poultry trim from the neck and the back of a poultry carcass, as well as meat from one de-boned dark meat leg portion, and residual poultry trim, in combination with non-meat protein enhancing ingredients such as homogenized liquid eggs which also act as a binder, long grain enriched white rice, and the option of soy products, as well as flavor enhancing ingredients. It is also contemplated for meat from market devalued birds damaged in processing to be ground and blended for such use. In using the poultry meat trim from the neck and the back of a poultry carcass, and other white or dark residual poultry trim or combination thereof, as well as the meat from one dark meat leg portion, the method of the present invention redistributes poultry meat to effectively maximize its use during processing to provide a raw, portioned poultry product which has enhanced flavor and nutrition when compared to portioned poultry products resulting from prior art processing methods.

The value enhancing method of the present invention is performed in a cooled processing room, the temperature of which is maintained at the USDA requirement. It starts with the steps of separating the dark meat leg portions from the back of the poultry carcass, with the pelvic bone clean, and portioning each breast separately with its three-joint wing remaining attached. Although not critical, as an option for hotel, restaurant, and institutional trade use, it is within the contemplation of the present invention for the wings to be detached from each breast at the second wing joint. Thus the drumette can be left on or detached. At this point in processing, a bird will have been sectioned into two bone-in leg portions which each comprise a connected thigh and drumstick, several bone-in chicken breast portions, and residual poultry meat remaining on the back, neck, and wing sections of the bird.

The sectioned portions of the bird must then be de-boned. Each bone-in leg portion is laid skin down on a cutting surface. With a sharp cutting instrument the thigh bone, drumstick bone, and cartilage are removed so that the entire leg portion meat muscle is left intact with the drum and thigh meat in one continuous solid piece of muscle tissue. Optionally, the skin may be removed if a low-fat raw poultry product is desired. The bone-in breast portions are similarly de-boned. Each breast portion is laid skin side down on a cutting surface. Although not critical, the chicken tender may be removed and processed for independent use. Then with a sharp cutting instrument the wish bone breast structure is removed from the breast meat. Optionally, the skin may be removed from both breast muscle halves if a low-fat raw poultry product is desired.

The residual poultry meat remaining on the neck, back, and the bones which were removed from the leg portions and breast portions is then removed by one or more mechanical boning devices. The type of boning device used is not critical to the present invention and it is contemplated for any of a variety of the boning devices commonly used in poultry processing facilities to be herein used. A section of the leg portion skin, as well as a section of the breast portion skin, may be added to the poultry meat trim depending upon the proportion of fat to solid muscle desired in the raw poultry product. To prepare the ground portion of the present invention, the weight of the accumulated poultry meat trim from the bird carcass is combined with one boneless dark meat leg portion with the skin on, to provide varying volume weight ratios of dark poultry meat to white poultry meat ranging between approximately fifty percent dark meat and one hundred percent dark poultry meat, depending upon the application. In the preferred embodiment, to enhance the protein content of the accumulated poultry meat trim and leg portion, they are ground a single time simultaneously with cooked long grain enriched white rice. The amount of cooked rice used is approximately equal to between twenty and thirty percent of the weight of the poultry meat trim and leg portion used. Although the type of grinder used is not critical, as long as one with an excessively fine grinding plate is not used, in the preferred embodiment the present invention contemplates the use of a one-eighth inch knife and plate grinder. In the preferred embodiment it is also contemplated for a combination grinder and mixer device to be used after grinding to blend flavor enhancing ingredients with the ground poultry meat and rice mixture until the blend solidifies into a cohesively bonded mass. In the preferred embodiment, and based upon a twenty-five pound batch of seasoned ground poultry blend, it is contemplated for the enhancing ingredients to be blended with the ground poultry meat and rice mixture for approximately ten to twelve minutes. Although the flavor and protein enhancing ingredients can vary, in the preferred embodiment and based upon a portion of poultry meat trim weighting approximately two pounds prior to grinding, it is contemplated for the following to be blended into the poultry meat and rice mixture: approximately four ounces of homogenized liquid eggs, approximately one-quarter of an ounce of garlic powder, approximately one ounce of sodium chloride, approximately one ounce of black pepper, and approximately two ounces of green pepper. Alternative ingredients can include, but are not limited to, seasoned cheese crumbs and soy products. All ingredients are maintained at processing room temperature during blending and other standard USDA requirements are followed to ensure the safe handling of the poultry meat, as well as the safe handling of all protein enhancing and flavor enhancing ingredients.

Once the ground and enhanced poultry meat is solidified into a cohesively bonded mass, the remaining dark meat leg portion and the several breast meat portions are cut with a sharp instrument so that they can form a uniform pocket around a portion of the bonded mass for even cooking. Larger breast portions may each be split into two equal portions prior to the pockets being formed so that the breast portions are horizontally filleted. When this is done, one bird produces four raw poultry meat breast portion products. To form pockets adequate to contain the cohesively bonded mass, boneless poultry breast portions are laid skinless side down on a cutting surface and butterfly cut. The butterfly cut is opened so that the de-boned side is also laid flat on the cutting surface. Although the means of accomplishing the butterfly cut is not critical to the present invention, in the preferred embodiment the butterfly cut is achieved using air circular knife devices or existing conveyor type processing. An amount of seasoned ground poultry meat blend equivalent to approximately one-third of the weight of the breast portion used is extruded onto the poultry breast along the complete length of the breast. In the preferred embodiment the type of dispenser or extruder used to apply the seasoned ground poultry meat blend to the breast meat portion is not critical. The breast meat portion is then rolled and tucked so as to maintain the solidified and cohesively bonded seasoned ground poultry meat blend within the center of the breast portion during both storage and cooking. Since the seasoned ground poultry meat blend forms a cohesive bond, the solid muscle of the breast portion does not become unwrapped and a raw poultry meat product is provided that will be tender, flavorful, and cook evenly.

To similarly prepare the remaining boneless dark meat leg portion of solid thigh and drumstick muscle, it is laid flat with its de-boned side up. A longated fillet incision made in the inside section of each thigh and drumstick portion one-third of the distance from one of its side edges. As with the breast portion, an amount of seasoned poultry meat blend equivalent to approximately one-third of the weight of the leg portion used is extruded onto the length of the solid muscle dark meat leg portion. In the preferred embodiment the type of dispenser or extruder used to apply the seasoned ground poultry meat blend to the leg meat portion is not critical. The dark meat leg portion is then evenly rolled with the sliced flat longated incision acting as a lock to maintain the seasoned ground poultry meat blend within the center of the leg portion during both storage and cooking. Once the poultry breast portions and poultry leg portion of the present invention are each completely formed into an individual serving portion, they are cryogenically frozen within a time period of approximately two minutes at a temperature approximately three hundred and sixty degrees Fahrenheit below zero.

The primary objective of the present invention is to provide the poultry industry with a method for processing poultry that gives a better flow of dark meat and thereby a more even flow of an entire poultry carcass. Also, by changing a commodity into a food product with variable ratios of white poultry meat to dark poultry meat, the present invention provides the poultry industry with a bird processing method having pricing option flexibility of potential benefit to the public. Different applications of the preferred embodiment of the present invention are contemplated, and to satisfy the requirements for such applications, the ingredients used in the seasoned ground poultry meat blend are varied. For example, more of the poultry skin may be added to the seasoned ground poultry meat blend used to feed HIV/AIDS patients so as to provide them with a food product having a higher fat content. Also, it would be contemplated to vary the amount of rice starch, carbohydrates, and sodium chloride to suit the needs of such patients to ensure them an easily digestible food product. Since the present invention provides an enriched poultry meat portion that costs less than poultry breast meat portions produced by conventional poultry processing, the present invention would provide a cost savings to the feeding programs underwriting HIV/AIDS patient feeding. The present invention could also easily conform to Kosher applications, by using varied proportions of boneless Kosher white poultry trim and Kosher thigh poultry meat, or it could comprise no dark poultry trim at all. Also, for military and institutional feeding programs, the present invention dark meat leg portions alone could be used to produce an economical, low-labor poultry food product having a high protein content and a food product that cooks evenly thereby requiring little handling or preparation. To suit the need of patients requiring special diets, including those with food allergies, the ingredients added to the ground poultry meat and rice mixture could be varied accordingly. Also, for low fat diets, the poultry skin could be omitted from the ground poultry meat and rice mixture without compromising the nutritional value of the raw poultry meat product.

The preferred embodiments of the present invention method produce a raw poultry meat product which maintains its shape and texture while being subjected to a variety of traditional cooking techniques, including but not limited to grilling, micro-waving, pan frying, oven baking, deep frying, and steaming in preparation for barbecuing. The present invention also provides the institutional mass producer, as well as an individual cooking at home, an affordable alternative raw poultry meat product that is flavorful and easy-to-use. The present invention also produces an even product flow of poultry meat during poultry processing of whole birds which enables dark poultry meat to be merchandised at the rate of white poultry meat in proportion to the ratio of dark poultry meat to white poultry meat on a poultry carcass. It thus solves a long-standing poultry industry problem of having surplus market devalued poultry meat which included both dark poultry meat on leg portions and the meat on market devalued birds damaged during processing with the opportunity of providing a cost savings to both individual and institutional consumers.

What is claimed is:

1. A method for commercial preparation of poultry meat through which effective use of said poultry meat for human consumption is maximized and through which whole birds are formed into a minimum of three raw food portions, with one of said raw food portions being a dark meat food portion comprising a de-boned flavor and nutrition enhanced leg quarter, and at least two of said raw food portions being white meat food portions comprising de-boned flavor and nutrition enhanced poultry breasts, said method comprising the steps of providing a cooled processing room having its temperature maintained according to USDA requirements, a bird ready for sectioning which has leg quarters and poultry breasts, cutting means, de-boning means, grinding means, blending means, extruding means, cryogenic freezing means, a plurality of flavor enhancing ingredients, and at least one non-meat nutrition-enhancing protein ingredient; positioning said bird, said cutting means, said de-boning means, said grinding means, said blending means, said flavor enhancing ingredients, and said non-meat nutrition-enhancing protein ingredients within said cooled processing room; using said cutting means to separate each of said dark meat leg quarters from the remainder of said bird; using said cutting means to separate each of said white meat poultry breasts from said remainder of said bird; using said de-boning means to de-bone each of said dark meat leg quarters, each of said white meat poultry breasts, and said remainder of said bird to provide residual poultry meat, said de-boning of each of said dark meat leg quarters being performed so as to leave intact one continuous solid piece of thigh and drumstick muscle tissue; using said grinding means to grind said residual poultry meat and one of said dark meat leg quarters into ground poultry meat; using said blending means to add said flavor enhancing ingredients and said non-meat nutrition-enhancing protein ingredients to said ground poultry meat to form a seasoned ground poultry meat blend; continuing to use said blending means to mix said seasoned ground poultry meat blend until said seasoned ground poultry meat blend solidifies into a cohesively bonded mass; using said cutting means to cut a pocket into the remaining one of said dark meat leg quarters and said breast; using said extruding means to place an amount of said seasoned ground poultry meat blend into each of said pockets; rolling said dark meat leg quarters and said breast so as to retain said seasoned ground poultry meat blend within the center of each of said portions during storage and cooking; and cryogenically freezing said portions for storage so as to maximize use of the meat on an entire poultry carcass while converting a commodity into a food product.

2. The method of claim 1 wherein said step of providing grinding means comprises the providing of a one-eighth inch knife and plate grinder.

3. The method of claim 1 wherein said step of cryogenically freezing is accomplished during a time period of approximately two minutes and at a temperature of approximately three hundred and sixty degrees Fahrenheit below zero.

4. The method of claim 1 wherein said steps of providing a plurality of flavor enhancing ingredients and at least one non-meat protein enhancing ingredient for creating a seasoned ground poultry meat blend comprise the steps of providing approximately four ounces of homogenized liquid eggs, approximately one-quarter of an ounce of garlic powder; approximately one ounce of sodium chloride, approximately one ounce of black pepper, and approximately two ounces of green pepper, for a portion of said residual poultry meat weighting approximately two pounds prior to grinding.

5. The method of claim 1 further comprising the step of providing at least one optional ingredient targeted for use by people having specific dietary requirements, and wherein said ingredient is selected from the group consisting of homogenized liquid eggs, seasoned cheese crumbs and fat, and poultry skin.

6. The method of claim 1 further comprising the steps of providing cooked long grain enriched white rice, and grinding said rice in one step with said residual poultry meat.

7. The method of claim 6 further comprising the steps of providing said rice in an amount equivalent to between approximately twenty and thirty percent of the weight of said residual poultry meat.

8. The method of claim 1 further comprising the step of horizontally filleting larger breast portions to thereby split each of said larger breast portions in half to provide a total of four pieces of de-boned white meat poultry breast which can be used in preparing a total of at least five raw food portions from one of said whole birds.

9. The method of claim 1 further comprising the step of using an amount of said seasoned ground poultry meat blend equivalent to one third of the weight of the ones of said dark meat leg portions and the ones of said breast meat portions onto which said seasoned ground poultry meat blend is extruded.

10. The method of claim 1 further comprising the step of removing the poultry wings from said breast meat portions.

11. The method of claim 1 further comprising the step of removing second and third wing joints from said breast meat portions so as to leave a first wing joint attached to each of said breast meat portions.

12. The method of claim 1 further comprising the step of providing said ground poultry meat comprising a ratio of dark poultry meat to white poultry meat ranging between approximately fifty percent dark poultry meat and one hundred percent dark poultry meat.

13. The method of claim 1 further comprising the step of butterfly cutting said dark meat leg portions and said breast portions to form said pockets.

14. The method of claim 1 further comprising the step of removing the poultry skin from said dark meat leg portions and said breast portions prior to placing said seasoned ground poultry meat blend onto dark meat leg portions and said breast portions.

15. The method of claim 1 further comprising the step of removing the chicken tenders from said breast portions prior to placing said seasoned ground poultry meat blend onto said breast portions.

16. The method of claim 1 further comprises the step of making a longated fillet incision in said dark meat leg portions one third of the distance over so as to form a lock to better retain said seasoned ground poultry meat blend within each of said dark meat leg portions after rolling.

17. The product produced by the method of claim 1 and which at a minimum comprises one of said de-boned flavor and nutrition enhanced dark meat leg quarter individual raw food portion and two of said de-boned flavor and nutrition enhanced white meat poultry breast individual raw food portions.

* * * * *